May 2, 1950 M. BONNET 2,506,131
PERISTEREOSCOPIC APPARATUS FOR TAKING,
REDUCING, OR ENLARGING PICTURES
Filed Oct. 29, 1945 10 Sheets-Sheet 1
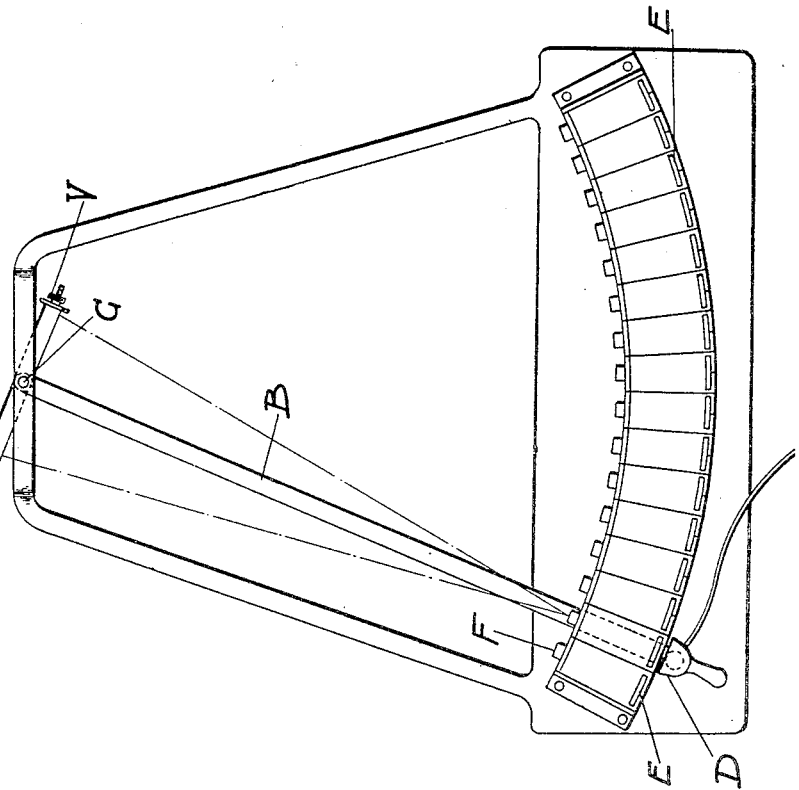
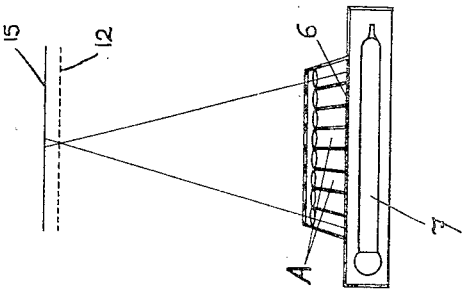
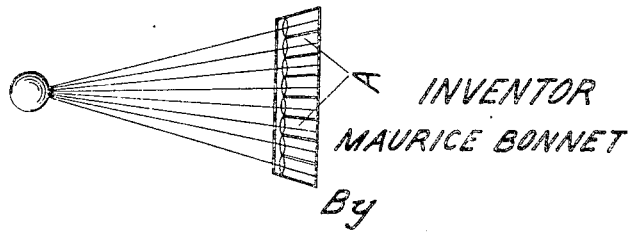
INVENTOR
MAURICE BONNET
By
Haseltine Lake & Co.
Attorneys

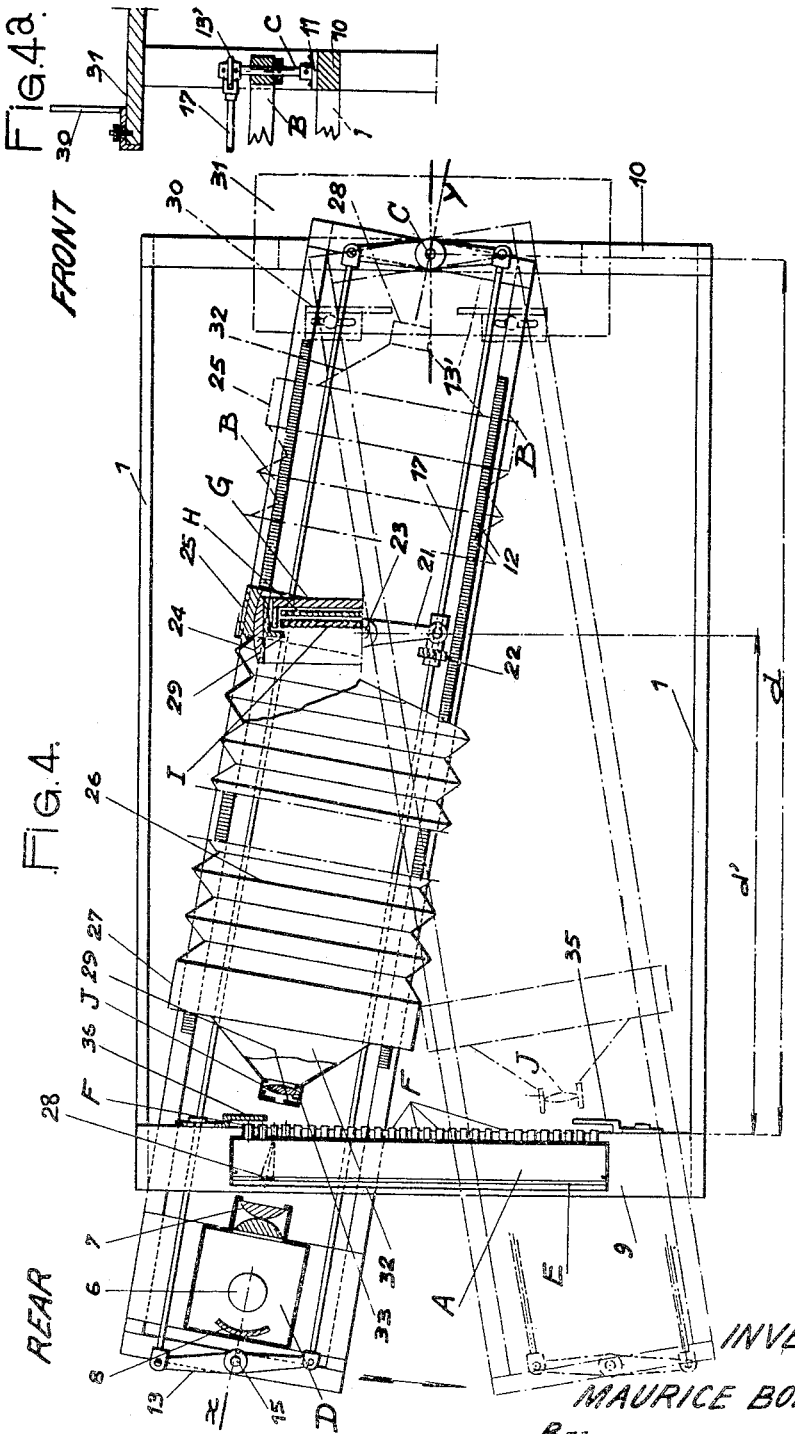

May 2, 1950
M. BONNET
2,506,131
PERISTEREOSCOPIC APPARATUS FOR TAKING, REDUCING, OR ENLARGING PICTURES
Filed Oct. 29, 1945
10 Sheets-Sheet 3
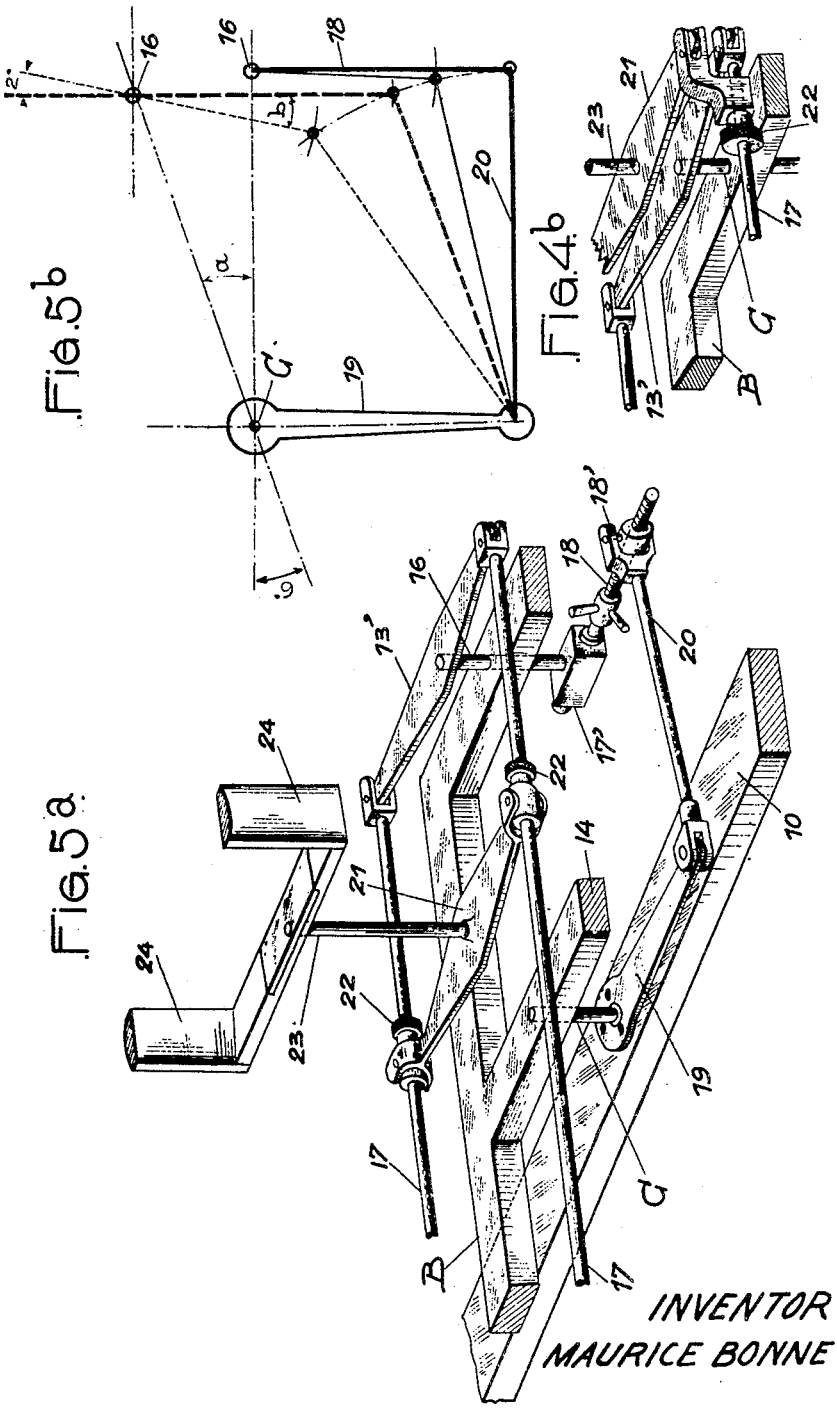
INVENTOR
MAURICE BONNET
By Haseltine Lake & Co
Attorneys

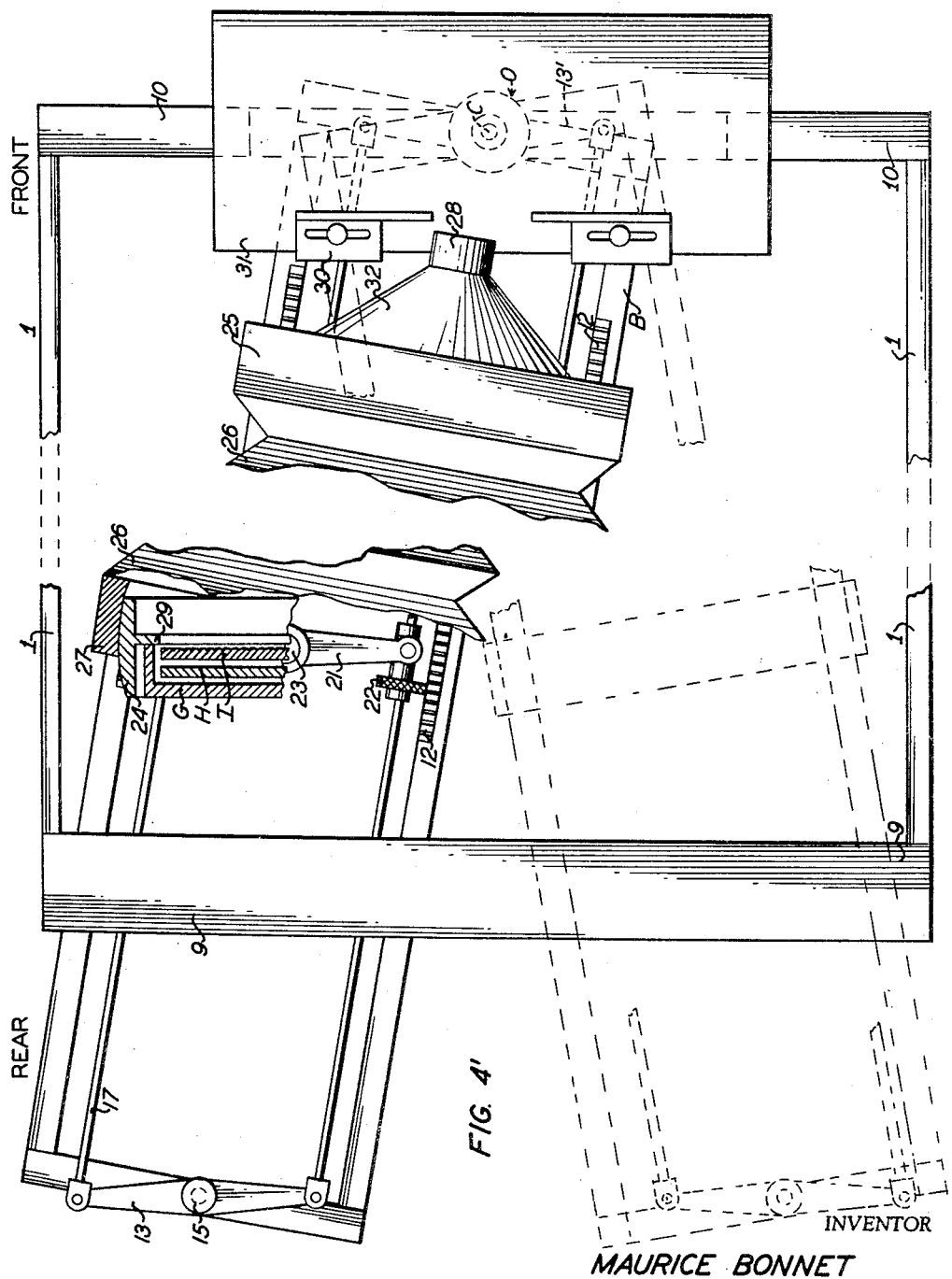

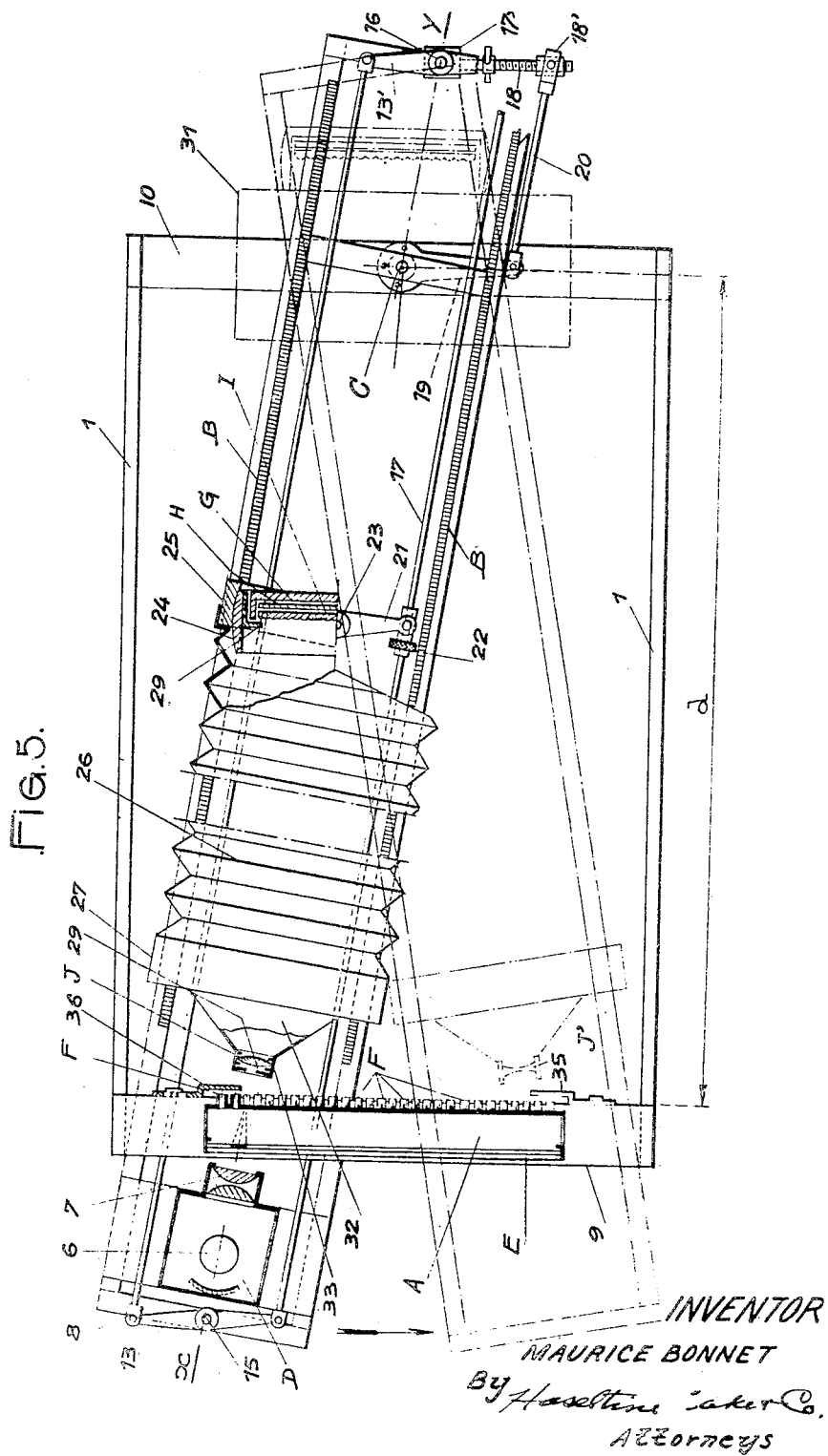

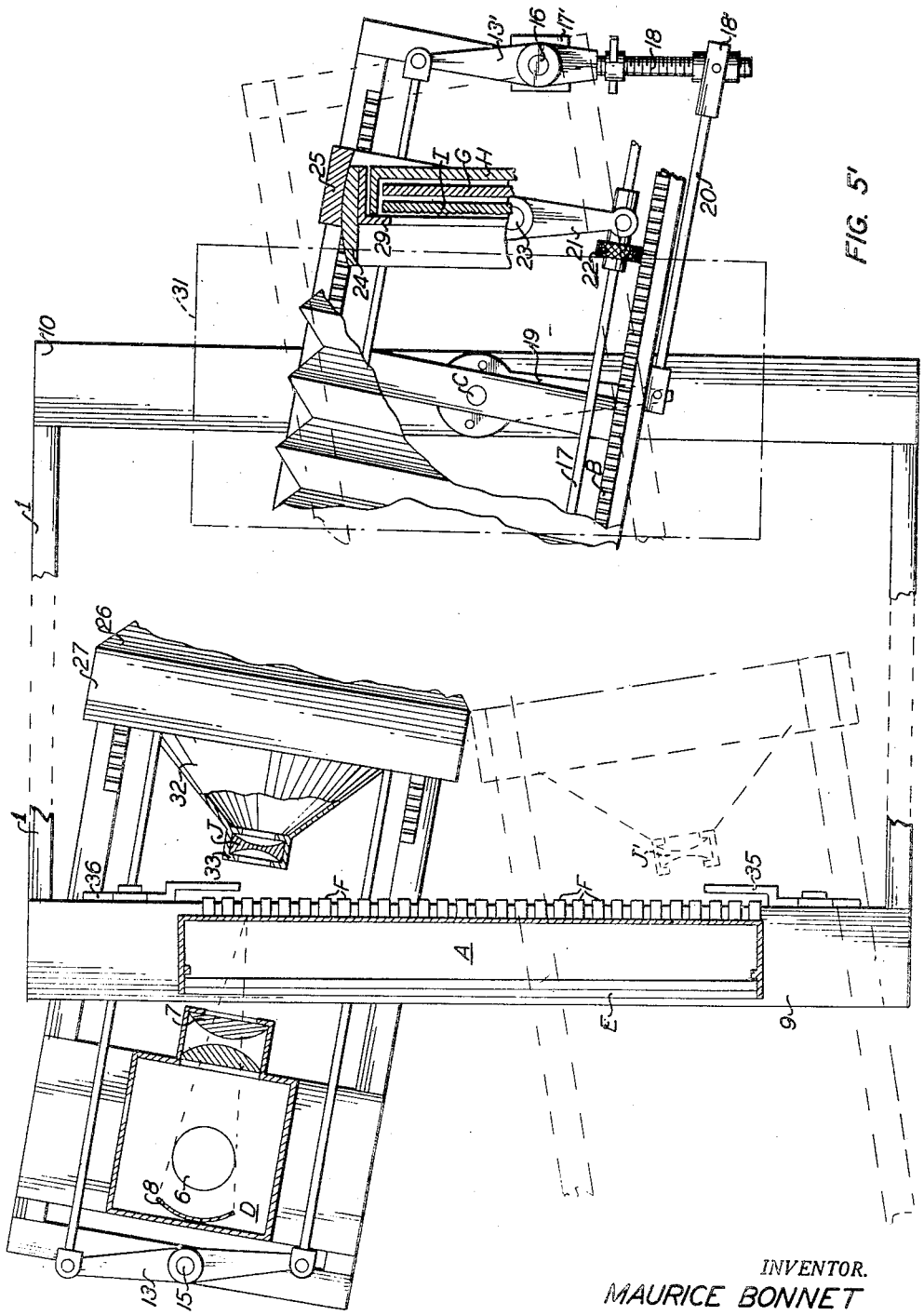

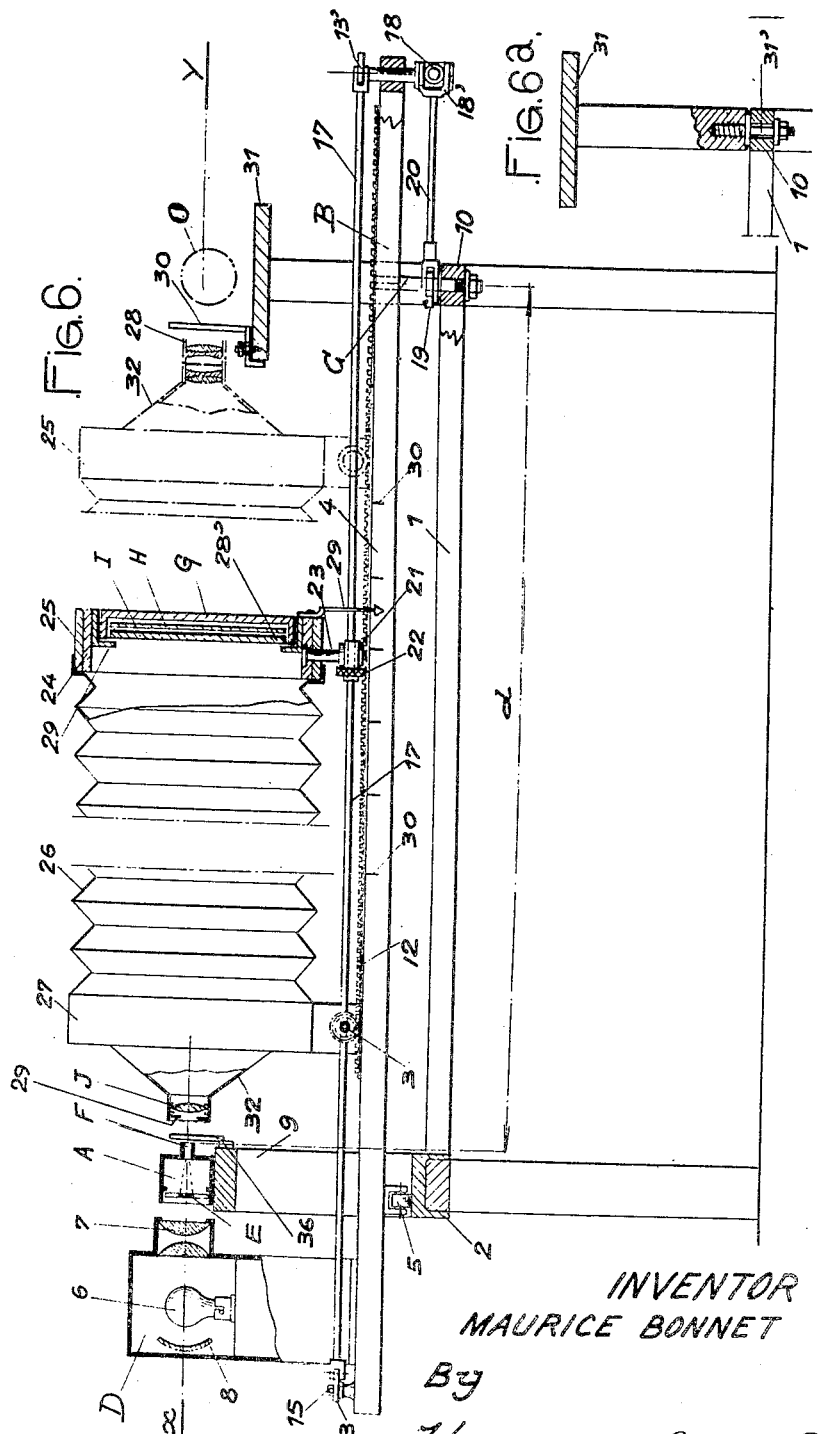

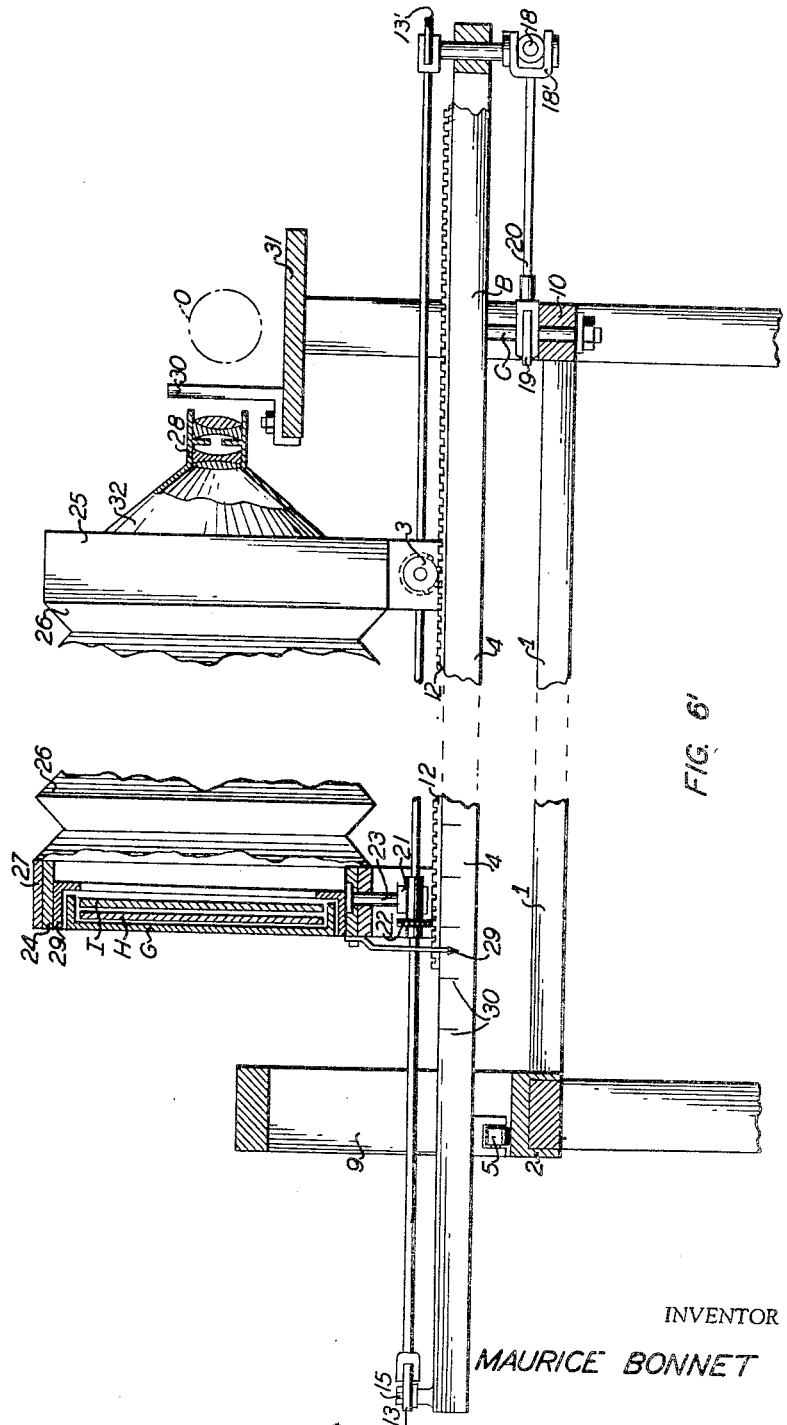

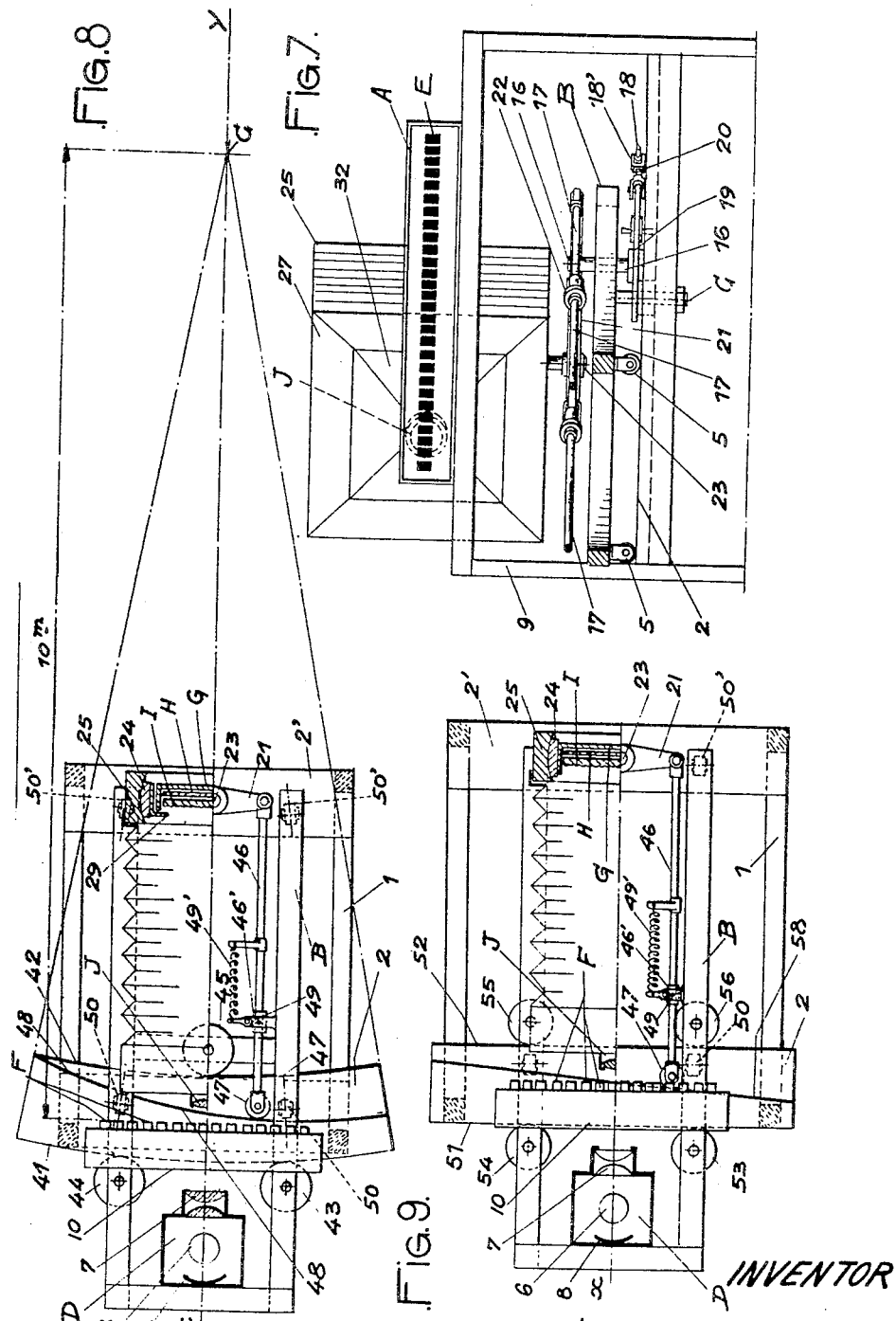

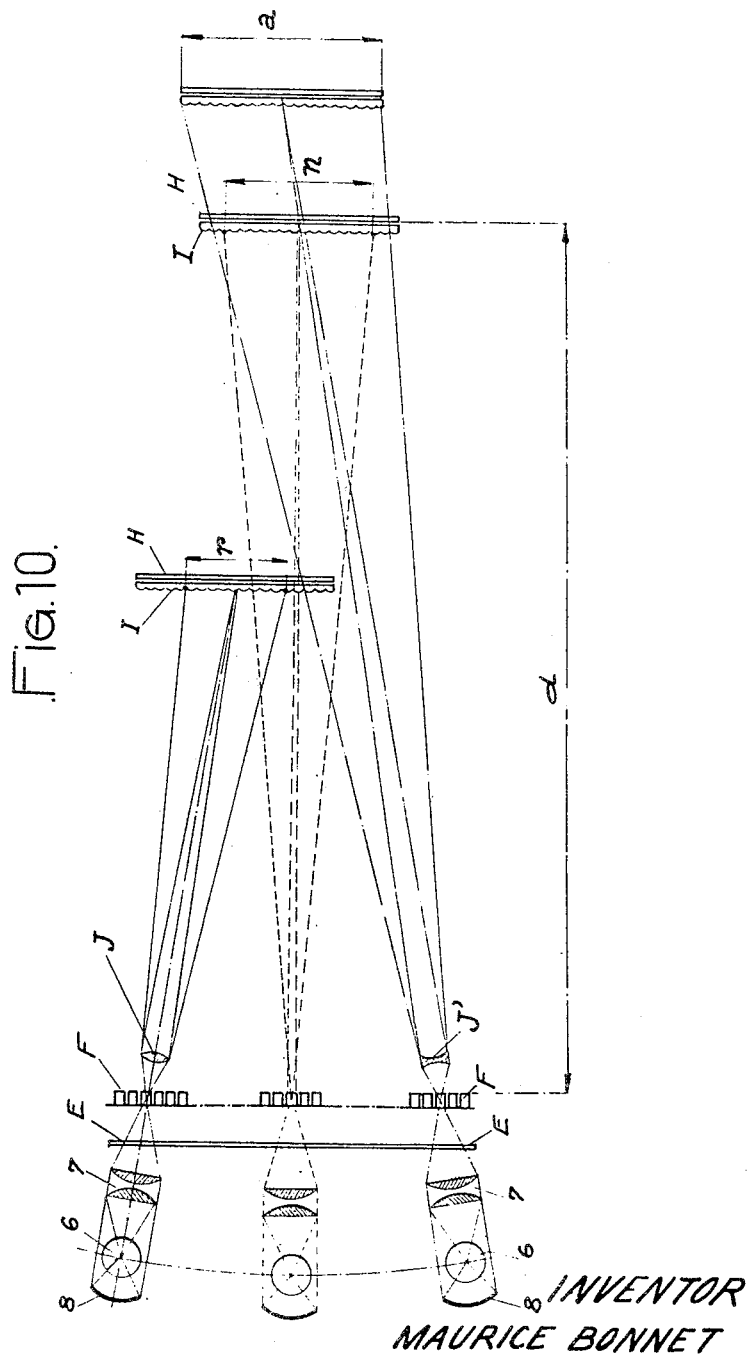

Patented May 2, 1950

2,506,131

UNITED STATES PATENT OFFICE 2,506,131

PERISTEREOSCOPIC APPARATUS FOR TAKING, REDUCING, OR ENLARGING PICTURES

Maurice Bonnet, Paris, France, assignor to La Reliephographie, Societe pour l'Exploitation des Procédés de Photographie en relief Maurice Bonnet, Paris, France, a French corporation Application October 29, 1945, Serial No. 625,385
In France December 15, 1943

Section 1, Public Law 690, August 8, 1946
Patent expires December 15, 1963

16 Claims. (Cl. 88—24)

This invention relates to peri-stereoscopic pictures of a kind already disclosed, in which the positive image is associated with a front transparent lenticular screen, called a selectoscope.

The term "selectograph" is chosen to designate an optical, lenticular selecting screen when such screen is used for taking photographs. The term "selectoscope" designates a similar screen when used for viewing peri-stereoscopic pictures so taken. And the term "selectogram" designates the pictures so taken.

The positive images entering into the composition of such peri-stereoscopic pictures are, according to one of the methods utilised by me, printed from negative plates, obtained, in their turn, by means of a camera having a single lens. This apparatus can be displaced through an arc of a circle round the subject to be photographed taken as a centre, and its chamber comprises a frame in which the plate or other sensitive surface is arranged behind a lenticular screen or a selectograph, and exactly corresponding to the selectoscope. The apparatus is so devised that the frame carrying the unit constituted by the negative plate and the selectograph is moved, during view-taking, in parallelism to itself in order to effect a kind of circular movement of translation around the subject. As the lined negative is thus obtained through a selectograph, the positive can be obtained by the usual methods of printing by contact.

According to another method, the various images are juxtaposed on a non-lined negative plate, and their association, obtained on the positive image layer, by means of the selectograph, procures the effect of relief when the positive is observed through the selectoscope. Instead of being taken with a single lens of a rotating apparatus, and through a selectograph associated with the sensitive plate, the negative images are obtained through the medium of an apparatus comprising, arranged along a straight line, a row of lenses having convergent lines of sight, the point of convergence corresponding to the location of the subject to be photographed. This apparatus is diagrammatically illustrated in Fig. 1 of the drawings accompanying the present specification. The whole structure of the said apparatus, denoted by A, the equivalent of which forms one of the components of the particular unit forming the subject-matter of the present invention, comprises a chamber divided by partitions into compartments corresponding in number to the lenses. In the rear part of this chamber can be placed a frame for the negative intended to receive multiple views. The positive is printed, as shown in Fig. 2 of the accompanying drawings, by illuminating the negative 6 from the rear by means of a lamp 7, and by projecting it onto a positive sensitive surface 15, a selecting screen, constituted by a grid or grating 12, being interposed in the path of the rays at a suitable distance in front of the sensitive surface.

According to another means the principle of which is known (see United States Patent No. 1,942,638) and is recalled to mind by the diagram of Fig. 3 of the accompanying drawings, an arm B pivoting at C, carries at its free end a projection lantern D, which illuminates in succession each of the various negative plates E in order to project the image onto the selector and the positive sensitive surface arranged in a frame G. In this apparatus, the classification of the image lines behind the selector is produced by sliding the latter over the positive sensitive surface by means of a micrometer screw V.

The printing takes place by stages, the screw V being rotated by hand, through a definite angle, after the projection of each negative. Inversely, the classification of the image lines, with the means forming the subject-matter of the present invention, is obtained by a non-intermittent, i. e. continuous, pivotal movement of the unit G round the axis C. The distance separating the lenses F from the pivot C is equal to the distance separating the lenses from the subject photographed when taking the views. Under such conditions, and by reason of the return of the rays in the reverse direction, the image obtained at G reproduces the subject in its full size.

The present invention is illustrated by way of example in Figures 4 to 10 of the accompanying drawings, in which:

Figure 4 is a plan view, partly in section, of the apparatus as a whole;

Fig. 4' shows a modification of Fig. 4;

Figure 4a shows a detail in sectional elevation;

Figure 4b shows a detail in perspective;

Figure 5 is a plan view of a modification;

Fig. 5' shows a modification of the device of Fig. 5;

Figure 5a shows part of the mechanism of Figure 5 in perspective;

Figure 5b is a diagrammatic view of part of the same mechanism in plan;

Figure 6 shows the apparatus of Figure 5 as a whole in elevation;

Figure 6' shows a modification of the device of Fig. 6;

Figure 6a shows a modification of a detail of Figure 6 in sectional elevation;

Figure 7 is a view of the apparatus of Figure 5 in end elevation;

Figures 8 and 9 are plan views of two other embodiments of the invention; and

Figure 10 is a diagrammatic view in plan.

In accordance with the present invention, the general principle applied in this latter method, of printing, by successive projections, is employed, but with the use of the first apparatus mentioned above. As shown in Figure 4 of the accompanying drawings, an apparatus A having multiple lenses F arranged in a rectilinear row, and identical with the camera, or it may be the camera itself, is arranged on a frame I, which carries a pivot C the axis of which is located at a distance from the plane of the multiple lens F equal to that which separted the view-taking lenses from the subject photographed. On a frame B, also pivoting at C, is fixedly mounted to the rear of the apparatus A a projection lantern D; and in front of the lenses F is mounted the plate-holder G carrying the positive, longitudinally movable on the frame B, and containing the sensitive plate H, intended to provide the positive, and the lenticular selecting grating or selectograph I. The projection of multiple images of the negative E on to the system H—I through the corresponding multiple lenses F takes place, according to the invention, through what we will call an interchangeable "convergence-correcting lens," the features of which vary according to the position given to the positive-carrier G on the pivoting frame B. As the pivot C is always located at the distance $d$ which separated the subject photographed from the lenses of the apparatus A, the correcting lens J is so devised as to re-establish the suitable convergence of the luminous rays at a given printing distance $d'$, which is less than $d$, and which corresponds to a definite reduction in the size of the subject photographed.

The arrangement according to the invention therefore essentially comprises, in association with a stationary negative-carrying apparatus A, a pivoting unit constituted by a lantern D and a positive-carrying plate-holder G, the latter being longitudinally movable with reference to the lantern in order that its position may be adjusted. To each definite position of the positive-carrying plate-holder on the frame B corresponds a definite correcting lens J, the characteristic features of which are easy to establish, either empirically or by calculation.

In accordance with a further feature of the invention the apparatus devised according to this new principle may be so constructed as to permit at will of obtaining an image of a size smaller than that of the subject photographed, or of the same size, or even an enlarged image of the subject. For this purpose, the pivoting frame B that serves as a support for the positive-carrier G and for the lantern D is replaced by a beam; in other words, it is extended rearwardly beyond the pivot C (compare Figs. 4 and 5), which renders it possible, by moving the positive-carrying plate-holder G on the rear arm of the said beam, to increase the distance $d$, so as to make is greater than the distance $d$, and to obtain in this manner an enlargement instead of a reduction of the peri-stereoscopic image in relation to the size of the subject photographed. According to the invention the features of the convergence-correcting optical member J are inverted for all the positions of the positive-carrier G beyond the pivot C, as it must then possess divergent properties, whereas it was convergent when printing for reduction.

Finally the invention, in a particular embodiment, see Figs. 4' and 6' allows of converting the new printing device into a camera, by reversing the positive-carrier, thus transformed into a negative-carrier, and by substituting an appropriate optical lens for the convergence-correcting lens J. The apparatus as a whole is in this case provided with a removable object-carrying table, which can be placed in a position vertically above the pivotal axis C of the frame B.

With reference to Figs. 4 and 4' of the accompanying drawings a first embodiment of the invention will now be described in detail, as devised exclusively for effecting reduction and for taking views of small-sized objects.

An embodiment of a printer enabling reductions or enlargements of the subject photographed to be obtained will then be described with reference to Figures 5', 5a, 5b, 6 and 7.

Other embodiments of the invention concern various modifications for the utilisation thereof with a view to reducing images taken at a great distance see Figs 8 and 9.

*Printing for reducing only, on a variable scale*

Apparatus for printing for reduction only, on a variable scale, is illustrated in Figure 4, the main elements corresponding by their function to those of the two preceding figures being indicated by the same reference letters. In this figure, I denotes a frame carrying at one of its ends a vertical pivot C. On the latter rotates the frame B, provided with rollers 5, as shown in Figure 6, by means of which it bears on an upper extreme cross bar of the frame I, forming a rolling track 2. A projection lantern D comprising a lamp 6, a condenser 7 and a reflector 8, is secured to the end of the frame B opposite to the pivot C. In order that the invention may be clearly understood, this end of the device will be called the rear end, the front end being that where the pivot C is located.

The frame B moves under a bridge 9, which is part of the frame I, and on which is placed the negative-carrying photographic apparatus A, the multiple lenses of which are denoted by F. Each of these lenses is preferably provided with a diaphragm having as long a horizontal slot as possible, the function of which will be set forth later on. The negative, showing a rectilinear row of multiple images to be projected, is placed in position in the apparatus A as shown at E.

The pivotal movement of the frame B about the axis C can be caused by a suitable driving device, not shown, for instance an electric motor actuating one of the rollers 5 (Figure 6) through the medium of a reduction gear.

The frame B carries a parallel motion linkage system, constituted by beams 13 and 13', mounted on pivots 15 and C, and by two rods 17 pivotally secured to the ends of the two beams. The pivot 15 is secured to the frame B, and the beam 13 freely rotates round this pivot. The pivot C, on the contrary, to which is rigidly secured the beam 13', passes through the cross-bar of the frame B, as shown in Figure 4a. This pivot C acts as a pivot for the frame B, and is secured to the terminal cross-bar 10 of the frame I, for instance by means of a strap 11 pinned to the said pivot.

Constant parallelism is thus obtained between the beams 13' and 13 on the one hand and the multi-negative plate E on the other hand, whatever may be the angular position taken by the frame B in its pivotal movement round the pivot C.

In order to impart to the positive-carrier G, in its turn, a circular movement of translation parallel to the multi-negative plate E, this positive-carrier is rendered rigid by means of a spindle 23 with the middle point of a beam 21, which is guided at its ends along the rods 17 constituting the longitudinal sides of the parallel motion 13, 17, 13'. The beam 21 can be locked in any required position along the rods 17 by means of clamping sleeves controlled by milled knobs 22. Only one of these stopping members is illustrated. The positive-carrier G pivots within the front compartment 25 of a photographic chamber 26 of known bellows type, the rear compartment of which is denoted by 27.

As illustrated, the uprights of a framing 24, which receives the positive-carrier G, are part cylindrical, and fit with slight friction against the corresponding walls of the front compartment 25, for the purpose of preventing light from passing between these two members, while allowing relative movement thereof.

The front and rear compartments 25 and 27 can be moved along the frame B by means of pinions 3 (see Figure 6), meshing with racks 12 on this frame, and controlled for instance by milled knobs, not shown.

The displacement of the rear case 25 causes the beam 21 to slide along the rods 17, when the locking knobs 22 are loosened, and it is thus possible to vary the distance separating the element A from the element G, according to the invention, with a view to obtaining changes in the scale of the positives printed with the said apparatus.

The distance $d$ separating the lenses F from the pivot C is equal to the distance separating the subject photographed from the lenses of the camera, as in the apparatus according to Figure 3.

In accordance with the invention, the apparatus may comprise an object-carrying table shown at 31 (Fig. 4'), resting on the cross-bar 10 of the main frame 1. The frame B can be freely moved underneath the table 31 and between the uprights to the bridge 9 supporting the apparatus A.

The rear case 27 is so arranged as to receive a removable cone 32, on which can be mounted, in suitable attachments 33, interchangeable convergence-correcting lens J. The attachments are so arranged as to receive, behind the said correcting lens J, a diaphragm 29, which is interchangeable like the said lens, and co-operates with the diaphragms of the lenses F in order to exactly define the luminous beams emanating from the said lenses.

As will be seen later on, in accordance with the invention, a framing 24 having a cylindrical joining surface and a negative carrier such as G, or else a ground-glass plate-holder, can be placed in position in the rear compartment 27 when the apparatus is utilised for taking views, Fig. 4'.

For this purpose the front compartment 25 is in its turn so arranged as to receive in addition a lens-carrying cone such as 32.

The apparatus is preferably provided with two lateral screens 35, 36, secured in adjustable positions in the lateral direction on the bridge 9, and enabling one or more of the extreme lenses F to be covered as desired.

Figure 4 shows the apparatus in position for a printing operation, the pivoting unit B, G, D being shown in full lines in its starting position. This same figure shows in dot-and-dash lines the position occupied by the said unit at the end of the printing operation.

The operation of the apparatus illustrated as a printer is as follows: The multi-lens apparatus A (which may be that which has served for photographing the subject at the distance $d$) is placed in position on the bridge 9. Auxiliary means (set screws or other suitable members, not shown), allow of accurately adjusting the level and of setting the apparatus relatively to the optical axis X—Y of the printer proper, with a view to ensuring the correct centering of the images on the positive H.

If obtained with the apparatus A, the multi-negative plate E is developed, and then replaced in position in the latter.

The positive is then printed through the continuous pivotal movement of the frame B on the pivot C.

The central ray of the beam of light emanating from the projection lantern D, when the frame B occupies the position shown in full lines in Figure 4, first passes through the image 28 corresponding to the third lens F, starting from the top of the figure, the two first lenses being covered by the screen 36. By reason of the return of these rays in the reverse direction, and if no additional correcting lens such as J is interposed in their path, this negative image, after having passed through the lens F, will form again in full size in the plane of the pivot C. Since however the apparatus is intended, as in the case of Figure 4, to print positive proofs on a smaller scale than the subject photographed, the positive-carrier G is moved to a position nearer the lenses F than the point C, that is to say, to a distance $d'$ from the latter corresponding to the required ratio of reduction. In this case the cone 32 receives the corresponding correcting lens J, which restores at the distance $d'$ the focussing of the image 28 projected.

The latter is transformed, as known per se, on the positive sensitive surface H, by reason of the refraction caused by the cylindrical lenticular elements of the selectograph I, into a series of vertical image-lines, occupying a well defined position with reference to the lenticular elements of the selectograph.

During the continuous pivotal movement imparted to the frame B, in the direction indicated by the arrow in Figure 4, by the means above-mentioned, the lantern D will successively illuminate all the negative images such as 28 carried by the multi-negative plate E, and these images will each be reproduced, on the sensitive surface I, in the form of new image-lines juxtaposed to the preceding ones, during the circular movement of translation imparted to the positive-carrier G.

In fact, during the angular displacement of frame B between the starting position illustrated in full lines and the extreme position shown in dot-and-dash lines in Figure 4, the positive-carrier G has remained parallel to itself under the action of the parallel motion linkage system 13, 13', 17, which controls the setting of the beam 21. An angular relative movement between the positive-carrier G and the successive axes of projection X—Y is thus produced, this movement resulting in a classification, through a parallactic effect, of the image-lines in the order of succession of the negative images of the plate E behind each lenticular element of the selectograph.

The horizontally slotted diaphragms of the lenses F, in addition to the gain in sharpness they ensure, regularise the luminous flux which strikes the positive H during the progressive passage of the projection lantern D behind each of said lenses. Without said diaphragms the luminous rays emanating from the lantern would show a maximum intensity along the vertical axis of each lens, which intensity would progressively weaken until extinction when the axis of the lantern D passes between two lenses F, and would then again increase in intensity, and so on. The presence of the slotted diaphragms ensures, on the contrary, alternations of uniform illumination and sudden extinction, promoting the uniformity of exposure of the positive H.

When the frame B has reached the end of its stroke, that is to say when the last image of the negative plate E has been projected, the positive carrier G is removed from the front compartment 25, and the positive proof H is developed and is then provided with a selectoscope having characteristics identical with those of the selectograph I utilized for printing, in order to constitute the complete peri-stereoscopic image.

*Utilisation of the device as a camera (Figs. 4' and 6')*

As stated above, by means of a simple transformation, the apparatus can be rapidly adapted for view-taking. In the specification accompanying the present applicant's co-pending patent application No. 624,561, filed October 25, 1945, now Patent No. 2,492,520 of December 27, 1949 for "Device for obtaining peri-stereoscopic images, enlargements and reductions thereof, particularly applicable to macrophotography," a peri-stereoscopic apparatus for small objects is described, comprising a fixed frame and lens, the object to be photographed being supported by a rotating table, the rotation of which is transmitted to the negative-carrier, and to the selectograph rigid therewith, through the agency of a parallel motion linkage system.

The applicant has now found that by reason of the fact that the illuminating means are stationary when they are for instance placed on the ground, and consequently do not rotate at the same time as the object, the shadows formed move on the latter in proportion as the rotation of the object-carrying table takes place, and thus disturb the observation of the image. It is often difficult to remedy this drawback by securing all the illuminating means to the table. This disadvantage is avoided in the camera constituted by the adaptation of the printer described above.

For this purpose, the object O to be photographed is placed straight above the pivot C, on a table 31 (see Figure 6'). The latter may also carry the various projectors necessary for illumination. In this case, as indicated in Figure 4', the front compartment 25 of the photographic chamber 26 receives a cone 32, carrying a lens 28 instead of a convergence, correcting lens J, and the positive-carrier G of Fig. 4 is removed from the compartment 27. The compartment 27, on the contrary, receives a negative-carrier similar to the positive-carrier G, but inverted, so that the selectograph I that it contains is turned towards the lens 28 (see Figs. 4' and 6'). This negative-carrier is rendered rigid, by means of a spindle such as 23, with the sliding beam 21, which is caused to slide up to the level of the compartment 27, or is connected by means of the said spindle with a supplementary beam such as 21, permanently provided under the compartment 27, which then acts as the rear compartment of the photographic chamber 26.

The lantern D of Figs. 4 and 6 remains in this case inoperative, and the apparatus A can be removed from the bridge 9.

If a negative plate is then exposed behind a selectograph, such as I, mounted in the negative-carrier pivoting inside the compartment 27, through the lens 28 mounted on the compartment 25, by causing the frame B to pivot round the axis C in a continuous movement, with the axis of the object O to be photographed placed on the table 31 practically coinciding with the axis C, successive images of the object, seen under different sighting angles will be recorded on the negative plate H, this recording taking place in the form of vertical image-lines, classified by the action of the selectograph. When developed, the negative plate is printed by contact, in order to obtain a lined positive proof or selectogram which, when covered with a selectoscope, gives a peri-stereoscopic image of the object. In order to obtain correct positioning and focussing of the image on the negative, the negative-carrier G will be temporarily replaced, in the framing of compartment 27, before taking the views, by a plate-holder carrying a groundglass plate.

*Printing in full size or enlargement on a variable scale*

Printing full-size proofs necessitates, as stated above, bringing the positive-carrier G to the distance d from the lenses F, that is to say straight above the pivot C. When the apparatus comprises a table 31 for taking views, this table does not allow the positive-carrier to be brought into vertical alignment with the pivot of the frame. The beam 13' constitutes another obstacle preventing the two pivots C and 23 from being placed in coincidence, unless the forks of the pivot joints of the beam 21 are of a very particular arrangement, diagrammatically illustrated in Figure 4b.

The modification illustrated in Figs. 5, 5', 5b, 6 and 7 offers the possibility of obtaining such prints in full size, as well as enlargements of the object photographed. It differs from the apparatus illustrated in Figures 4, 4a, and 4b by the fact that on the one hand the frame B is extended forwards beyond the pivot C, and thus forms a beam, on the rear arm of which are provided the positions of the front compartment 25 of the chamber with a view to obtaining reductions, whereas the positions for obtaining enlargements are provided on the front arm.

In these figures the same reference letters and numerals denote the members corresponding to those of the printer according to Figures 4, 4a, 4b.

Here again the cross-bar 14 of the frame B pivots on the spindle C, but the upper end of the said spindle no longer carries the front beam 13', which is transferred to the extended end of the frame B, where it is pinned to a vertical spindle 16, which terminates downwards, below the frame B, as a block 17', more clearly shown in Figure 5a.

In this block is freely rotatable one of the ends of a threaded rod 18, which is screwed at its opposite end inside a nut-forming sleeve, on which is journalled the fork-piece 19' of a rod 20, the other end of which is in its turn pivoted on the free end of a fixed arm 19, set at right angles to the longitudinal axis of the main frame 1, and mounted for instance on the lower part of the fixed spindle C. The elements 19, 20 and 18 constitute the three branches of a pivoted quadrilateral, which is located in a plane lower than that of the parallel motion linkage system 13, 17, 13', and the elements 19 and 18 of which, through their very construction, keep an unvarying angular setting. The use of the threaded rod 18 will be explained later on.

As the beam 15' is right with the fixed arm 19, through the medium of the spindle 16, the block 17', the threaded rod 18 and the rod 20, the parallel motion linkage system 13', 17, 21, 13 will play the same part as in the apparatus according to Figures 4, 4a, 4b, in association with the pivotal movement of the frame B round the pivot C.

As the beam 13' is thus moved away from the pivot C, the positive-carrier G can be moved, by displacing the whole of the front compartment 25, into vertical alignment with the pivot C, in order to obtain positive proofs in full size, in which case a convergence-correcting lens J is not used.

In this case, of course, the table 31 must be detachable, so that it can be removed when the device is not used for taking views, and so as not to prevent the displacement of the positive-carrier on the extension portion of the frame B.

For this purpose it may, for instance, be secured to the main frame 1, in the manner illustrated in Figure 6a. Each of its legs is extended in the form of a screw-threaded rod 31' provided with a base and passing through a corresponding perforation provided in the cross-bar 10 of the main frame and locked by a nut.

When the positive-carrier G is moved beyond the pivot C, for printing enlargements of the object photographed, the correcting lens J, which had convergent characteristic data for executing reductions, is replaced by a correcting lens J' having divergent characteristic data. Fig. 5' indicates in dot-and-dash lines the extreme position of the frame B, the apparatus being arranged for printing an enlargement, in which case the positive-carrier G occupies for instance the position indicated in said figure. The extension of the frame B beyond the pivot C as illustrated only allows limited scales of enlargement in the embodiment shown. Nothing prevents the said end of the frame B from being further extended, with a view to obtaining greater enlargements.

The front compartment 25 may be provided with an index such as 29 (Figure 6) moving in front of reference marks 30 on the frame B, each corresponding to a given size and to a definite corrector of convergence.

The diagram of Figure 10 indicates in dotted lines the path of the luminous rays corresponding to printing in full size. The format obtained is designated by n. No optical convergence correcting lens is used in this case. For printing reductions (the case of Figure 4) the path of the rays is that indicated in full lines; the format obtained is denoted by r, the convergence-correcting lens used in this case being designated by J. Finally, this diagram illustrates in dot-and-dash lines the path of the rays for printing enlargements, the format obtained being indicated by a, and the correcting lens J' having then divergent properties.

*Adjustment means*

When the printer operates normally, the positive-carrier G executes in accordance with the invention, and through the agency of the means indicated, a circular movement of translation, that is to say, it moves parallel to itself with the front compartment 25, which rotates round the pivot C, during the angular movement of the frame B.

In certain cases it may be desirable to diminish the effect of relief when observing the image. According to the invention this result is obtained by covering, when printing, a certain number of the marginal lenses F, by means of screens 35, 36, slidably mounted on the bidge 9, Fig. 4'. The useful pivotal stroke of the frame B, and consequently the angle of projection, are thus reduced in the required proportion and have the effect of attenuating the relief.

However, as the aperture angle of the lenticular elements of the selectograph 1 is invariable, since it depends on the very curvature of its lenticular elements, it is necessary that the positive-carrier G should always pivot through an angle equal to the said aperture angle during the reduced useful stroke of the frame B, in order that the vertical strip of photo-sensitive emulsion which corresponds to each lenticular element of the selectograph 1 may be impressed throughout its width.

A supplementary oscillation is consequently imparted in this case to the positive-carrier G, with reference to the angular stroke of the frame B. It is for this purpose that the length of the screw-threaded rod 19 of the pivoted quadrilateral is capable of being varied by screwing or unscrewing it in the sleeve of the fork-piece 18'.

Figure 5b illustrates in thick and full lines the position occupied by the lower quadrilateral 10, 20, 18, when the frame B occupies its mean position, and in heavy dotted lines the position it assumes when the said frame is at the end of its stroke, in the case of the quadrilateral constituting a parallelogram. The tracing in thin full lines illustrates this same parallelogram distorted by the shortening of the rod 18 thereof when the frame B is in its mean position, and the tracing in thin dotted lines shows it at the end of its stroke. It will immediately be seen in the figure that during the stroke of the frame B corresponding to the angle a, the beam 13' effects a supplementary angular movement b, which is all the greater when the length of the rod 18 is more reduced.

By this means it becomes possible, for instance, to print a peri-stereoscopic image taken with a recording angle of 12°, by using a selectograph and a selectoscope, the lenticular elements of which have an opening angle of 16°, in order to obtain an effect of attenuated relief. Figure 5b bears the indication of the value of these various angles.

The adjustment possibilities offered by a rod 18 of variable length also allow the perfectly accurate setting of the apparatus.

Figures 4, 5 and 6 show that the positive-carrier G is not directly mounted in the framing 24, which forms a cylindrical joining surface within the front compartment 25. In accordance with the invention it is placed in an intermediate frame 29 sliding within the framing 24, along the longitudinal axis of the printer.

The reason of this particular arrangement is the following: If, when taking the views, the subject photographed was not exactly located at the distance $d$, the image of the said subject, on projection, would not be formed exactly in the plane of the pivot C, that is to say, in the plane of the positive proof which coincides with the said pivot, when no optical member such as J is used. On the finished peri-stereoscopic image in full size the subject would appear, in these conditions, either "inside" or "outside" the plane of the image.

The sliding frame 29 however allows of advancing or drawing back the positive-carrier through the necessary amount, within the framing 24, in order to correct the error in distance made when taking the view. Such a correction can naturally be effected, under the same conditions, for all ratios of reproduction, either enlargement or reduction, obtained by means of the correcting lenses J or J'.

Another means of re-establishing coincidence between the plane of the image projected and the plane of the positive consists, in accordance with the invention, in displacing the entire multilens apparatus A on the bridge 9 along the longitudinal axis of the printer. For this purpose the said multi-lens apparatus may for instance be placed on a platform which is movable, in parallelism to itself, in the forward and backward direction of the apparatus. This platform, of any construction whatever, is not shown in the drawings, and it may be associated with the above-mentioned means for adjusting the position of apparatus A.

*Printing of views taken at medium and at great distances*

It has been specified that the device described pivots round a spindle C, the distance of which from the lenses F is equal to that which, when taking the views, separated the said lenses from the subject or object to be photographed. Though it may be easy to satsify this condition when printing portraits, this is not the case for apparatus effecting the printing of architectural or landscape negatives, that is to say, photographs taken for instance at a distance of 10 or 20 metres.

According to the invention, this difficulty can be removed by causing the frame B to pivot about a fictitious vertical pivot, corresponding to the real sighting point of the lenses, and located at the centre of an arc of a circle actually described by the said frame B during its pivotal movement. The case can be contemplated in which the views were taken at a very great distance, that is to say, the case in which the lines of sight of the lenses F are practically parallel to each other. According to the invention, the frame B is then displaced in parallelism with itself, but it is necessary to ensure the pivotal movement of the positive-carrier G requisite for classifying the image-lines.

Figures 8 and 9 illustrate two embodiments of devices of this kind, permitting the printing of negatives recorded in the particular conditions indicated above, without resorting to apparatus of excessive dimensions. The printers shown in these figures comprise the greater part of the members previously described, which are designated therein by the same reference letters or numerals.

Figure 8 shows a printer intended for reproducing negatives taken at a distance from the subject equal to 10 metres, for instance. The frame B rests on two tables 2 and 2', carried by the main frame 1, through the medium of rollers 30 and 30' secured to the lower face of the girders of the said frame B. It is guided through an arc of a circle, as shown in the drawing, through the medium of three rollers 43, 44, 45 on vertical rolling tracks 41 and 42 of the table 2. The radius of curvature of the rolling tracks corresponds to the distance at which the views were taken, so that at each point of the path of the frame B the optical axis X—Y of the device passes through the pivot C. The same optical conditions as in the device according to the preceding figures are thus satisfied.

The pivotal movement of the positive-carrier G, within the front compartment 25, through an angle equal to that of the lenticular elements of the selectograph I is in this case obtained through the following device: the framing 24 is rigid with a vertical spindle 23, which carries an arm 21, to which is pivoted at one of its ends a push-rod 45. The latter carries, at its other end, a roller 47, which rolls on an incline 48 eccentric with reference to the rolling tracks 41 and 42. The push-rod 46 is guided and supported in a sleeve 46', which is journalled in a fork 49 secured to the girder of the frame B. The application of the roller 47 on the incline 48 is ensured for instance by the action of a spring 49', secured on the one hand to the push-rod 46 and on the other hand to the fork 49. The eccentricity of the incline 48 relatively to the pivot C is so chosen that the pivotal movement imparted to the framing 24 corresponds to the opening angle of the lenticular elements of the selectograph I, during the entire path followed by the frame B. It should be noted that this control of the pivotal movement of the positive-carrier is comparable with that described in my copending patent application No. 624,560, relating to "Peri-stereoscopic apparatus," filed October 25, 1945.

It is obvious that the mechanism shown in Figure 8 may comprise auxiliary devices similar to those illustrated in the preceding figures and intended for modifying the scale of reproduction, which may be only a reduction, as well as for ascertaining the exact angle through which the framing 24 is to pivot. For this purpose, the arm 21 may for instance be rendered longitudinally adjustable in the same way as the rod of the lower link-work of Figure 5a.

The embodiment illustrated in Figure 9 is similar to that shown in Figure 8, but is applicable when the views have been taken at a very great distance. The frame B must then move no longer rotatively round a point but in parallelism with itself. The guiding tracks 51 and 52 are therefore rectilinear. The frame B carries four rollers 53, 54, 55, 56. The pivotal movement of the frame 24 is again ensured by a mechanism similar to that of Figure 8, but the incline 58 controlling the pivotal movement also becomes rectilinear, as shown in the figure.

The operation of the two printers illustrated in Figures 8 and 9 need not be described in greater detail, as it is absolutely identical with that of the device forming the subject of the preceding figures.

Having now particularly described and ascertained the nature of my said invention and in what manner the same is to be performed, I declare that what I claim is:

1. A machine for printing peri-stereoscopic positives through multiple juxtaposed negative images obtained with a camera including a horizontal row of lenses comprising: a stationary support, a horizontal row of lenses secured to the rear end of said support, a pivot at the front end of said support at a distance from said row of lenses substantially equal to the distance at which said negative images were taken, an elongated frame adapted to rock round said pivot in such manner that the longitudinal axis of said frame sweeps successively each of said lenses, a projecting lantern carried by said frame behind said row of lenses, a camera secured on said frame, a transverse vertical spindle in said camera, a plate and selecting screen carrier, and means associating said carrier with said support for maintaining said carrier parallel to the objective plane of said row of lenses during the rocking motion of said frame.

2. A machine for printing peri-stereoscopic positives through multiple juxtaposed negative images obtained with a camera including a horizontal row of lenses comprising: a stationary support, a horizontal row of lenses secured to the rear end of said support, a pivot at the front end of said support at a distance from said row of lenses substantially equal to the distance at which said negative images were taken, an elongated frame adapted to rock round said pivot in such manner that the longitudinal axis of said frame sweeps successively each of said lenses, a projecting lantern carried by said frame behind said row of lenses, a camera secured on said frame, a plate and selecting screen carrier, a parallel motion linkage system having a front transverse member fixed to said stationary support, a rear transverse member fixed to the movable rear end of said elongated frame, and a complementary stationary transverse member incorporated in said parallel motion linkage system and secured to said plate and selecting screen carrier, for maintaining said carrier parallel to the objective plane of said row of lenses during the rocking motion of said frame.

3. A machine for printing peri-stereoscopic positives through multiple juxtaposed negative images obtained with a camera including a horizontal row of lenses comprising: a stationary support, a horizontal row of lenses secured to the rear end of said support, a pivot at the front end of said support at a distance from said row of lenses substantially equal to the distance at which said negative images were taken, an elongated frame adapted to rock round said pivot in such manner that the longitudinal axis of said frame sweeps successively each of said lenses, a projecting lantern carried by said frame behind said row of lenses, a camera secured on said frame, a transverse vertical spindle in said camera, a plate and selecting screen carrier adapted to pivot round said spindle inside said camera, means associating said carrier with said support for maintaining said carrier parallel to the objective plane of said row of lenses during the rocking motion of said frame, and means for longitudinally shifting said plate and selecting screen relatively to said carrier.

4. A machine for printing peri-stereoscopic positives through multiple juxtaposed negative images obtained with a camera including a horizontal row of lenses comprising: a stationary support, a horizontal row of lenses secured to the rear end of said support, a pivot at the front end of said support at a distance from said row of lenses substantially equal to the distance at which said negative images were taken, an elongated frame adapted to rock around said pivot in such manner that the longitudinal axis of said frame sweeps successively each of said lenses, a projecting lantern carried by said frame behind said row of lenses, a camera divided into two compartments and secured on said frame, a transverse vertical spindle in said camera, a plate and selecting screen carrier movable with said camera, located inside the front compartment thereof and adapted to pivot round said spindle, means for adjustably shifting said camera and carrier longitudinally of said frame, means associating said carrier with said support for maintaining said carrier parallel to the objective plane of said row of lenses during the rocking motion of said frame, and a correcting lens secured inside the rear compartment of said camera and adapted to focus onto said plate and selecting screen carrier the beam issuing from said projecting lantern and entering said camera through said row of lenses.

5. A machine for printing peri-stereoscopic positives through multiple juxtaposed negative images obtained with a camera including a horizontal row of lenses comprising: a stationary support, a horizontal row of lenses secured to the rear end of said support, a pivot at the front end of said support at a distance from said row of lenses substantially equal to the distance at which said negative images were taken, an elongated frame extending to the front of said pivot and adapted to rock round said pivot in such manner that the longitudinal axis of said frame sweeps successively each of said lenses, a projecting lantern carried by said frame behind said row of lenses, a camera divided into two compartments and secured on said frame, a plate and selecting screen carrier located inside the front compartment of said camera, means for adjustably shifting said camera and carrier longitudinally of said frame, a parallel motion linkage system having a front transverse member fixed to said stationary support and a rear transverse member fixed to the movable rear end of said elongated frame, a complementary transverse member slidingly incorporated in said parallel motion linkage system having said plate and selecting screen carrier secured thereto, whereby said carrier is maintained in parallel relationship with the objective plane of said row of lenses throughout the rocking motion of said elongated frame, and a correcting lens secured inside the rear compartment of said camera and adapted to focus onto said plate and selecting screen carrier the beam issuing from said projecting lantern and entering said camera through said row of lenses.

6. A machine for printing peri-stereoscopic positives through multiple juxtaposed negative images obtained with a camera including a horizontal row of lenses comprising: a stationary support, a horizontal row of lenses secured to the rear end of said support, a pivot at the front end of said support at a distance from said row of lenses substantially equal to the distance at which said negative images were taken, an elongated frame extending to the front of said pivot and adapted to rock round said pivot in such manner that the longitudinal axis of said frame sweeps successively each of said lenses, a projecting lantern carried by said frame behind said row of lenses, a camera divided into two compartments and secured on said frame, a plate and selecting screen carrier located inside the front compartment of said camera, means for adjustably shifting said camera and carrier longitudinally of said frame and for locating said carrier on either side of said pivot in accordance with the size of image required, a parallel motion linkage system having a front transverse member fixed to said stationary support and a rear transverse member fixed to the movable rear end of said elongated frame, a complementary transverse member slidingly incorporated in said parallel motion linkage system having said plate and selecting screen carrier secured thereto, whereby said carrier is maintained in parallel relationship with the objective plane of said row of lenses throughout the rocking motion of said elongated frame, and a correcting lens secured inside the rear compartment of said camera and adapted to focus onto said plate and selecting screen carrier the beam issuing from said projecting lantern and entering said camera through said row of lenses.

7. A machine for printing peri-stereoscopic positives through multiple juxtaposed negative images obtained with a camera including a horizontal row of lenses comprising: a stationary support, a horizontal row of lenses secured to the rear end of said support, a pivot at the front end of said support at a distance from said row of lenses substantially equal to the distance at which said negative images were taken, an elongated frame extending to the front of said pivot and adapted to rock round said pivot in such manner that the longitudinal axis of said frame sweeps successively each of said lenses, a projecting lantern carried by said frame behind said row of lenses, a camera divided into two compartments and secured on said frame, a plate and selecting screen carrier located inside the front compartment of said camera, means for adjustably shifting said camera and carrier longitudinally of said frame and for locating said carrier on either side of said pivot in accordance with the size of image required, a parallel motion linkage system having pivots on either side of and in alignment with said first mentioned pivot, the extreme transverse members of said system being adapted to rock round said pivots, a pivot secured to the front end of said elongated frame, a linkage connecting said first and last mentioned pivots and including a stationary member parallel to the plane of said row of lenses and located in alignment with said last mentioned pivot, a member of equal length to said stationary member pivotally secured to said last mentioned pivot and rigidly held in parallel relation to the corresponding one of said extreme transverse members, a third transverse member pivotally secured to both of said extreme transverse members whereby said extreme transverse members are held constantly parallel, and a complementary transverse member slidingly incorporated in said parallel motion linkage system having said positive and selecting screen carrier secured thereto, whereby said carrier is maintained in parallel relationship with the objective plane of said row of lenses throughout the rocking motion of said elongated frame, and a correcting lens secured inside the rear compartment of said camera and adapted to focus onto said plate and selecting screen carrier the beam issuing from said projecting lantern and entering said camera through said row of lenses.

8. A machine for printing peri-stereoscopic positives as claimed in claim 7 wherein said third transverse member is of adjustable length.

9. A machine for printing peri-stereoscopic negatives comprising a stationary support, a pivot at the front end of said support, an elongated frame adapted to rock round said pivot, a camera having a front and a rear compartment mounted on said frame, means for adjustably shifting said camera longitudinally of said frame, a negative and selecting screen carrier in said rear compartment, a parallel motion linkage system including one extreme transverse member held in a plane stationary with reference to said frame, the other extreme transverse member being adapted to pivot round a point located to the rear of said frame, and a complementary slidable transverse member incorporated in said parallel motion linkage system having said negative and selecting screen carrier secured thereto whereby said carrier is maintained strictly parallel to said plane, a view taking lens in said front compartment, and a removable stationary support located in front of said pivot and adapted to adjustably carry an object to be photographed.

10. A machine for printing peri-stereoscopic negatives as claimed in claim 9 having illuminating means and screens secured to said stationary support.

11. In a printing machine as claimed in claim 5, the provision of pinions mounted on the compartments of said camera, racks carried by said frame and engaging said pinions, and means for indicating on said compartments and on said frame the relative size of the image in accordance with the displacement of the camera.

12. A machine for printing peri-stereoscopic positives as claimed in claim 4 having a conical member rigid with the rear compartment of said camera carrying said correcting lens, and a vertically slotted diaphragm associated with said correcting lens.

13. A machine for printing peri-stereoscopic positives through multiple juxtaposed negative images obtained with a camera including a horizontal row of lenses comprising: a stationary support, a horizontal row of lenses secured to the rear end of said support, a horizontally slotted diaphragm associated with each lens of said row, a pivot at the front end of said support at a distance from said row of lenses substantially equal to the distance at which said negative images were taken, an elongated frame adapted to rock round said pivot in such manner that the longitudinal axis of said frame sweeps successively each of said lenses, a projecting lantern carried by said frame behind said row of lenses, a camera secured on said frame, a parallel motion linkage system having one extreme transverse member held in a plane parallel to the plane of said row of lenses and the other extreme transverse member adapted to pivot round a point to the rear of said elongated frame, a complementary stationary transverse member incorporated in said parallel motion linkage system, and a plate and selecting screen carrier secured to said complementary member, whereby said carrier is maintained parallel with the objective plane of said row of lenses during the rocking motion of said frame.

14. A machine for printing peri-stereoscopic positives as claimed in claim 13 having screens adjustably secured to said frame and adapted to cover a varying number of the extreme lenses of said horoizontal row of lenses.

15. A machine for printing peri-stereoscopic positives through multiple juxtaposed negative images obtained with a horizontal row of lenses, said machine comprising a stationary support, a horizontal row of lenses secured to the rear end of said support, concentric stationary guideways, an elongated frame adapted to move along said guideways in such manner that the longitudinal axis of said frame sweeps successively each of said lenses, a projecting lantern carried by said frame behind said row of lenses, a camera secured on said frame, a transversal vertical spindle in said camera, a plate and selecting screen carrier adapted to pivot round said spindle inside said camera, and means associating said carrier with said support for keeping said carrier parallel with the objective plane of said row of lenses, and including a connecting rod controlling said carrier, an arcuate guideway eccentric with reference to said first-mentioned guideways, and a roller carried by said connecting rod and constrained to follow said last mentioned guideway.

16. A machine for printing peri-stereoscopic positives through multiple juxtaposed negative images obtained with a horizontal row of lenses, said machine comprising a stationary support, a horizontal row of lenses secured to the rear end of said support, parallel rectilinear guideways, an elongated frame adapted to move along said guideways in such manner that the longitudinal axis of said frame sweeps successively each of said lenses, a projecting lantern carried by said frame behind said row of lenses, a camera secured on said frame, a transversal vertical spindle in said camera, a plate and selecting screen carrier adapted to pivot round said spindle inside said camera, and means associating said carrier with said support for keeping said carrier parallel with the objective plane of said row of lenses and including a connecting rod controlling said carrier, a rectilinear guideway oblique with reference to said first mentioned parallel rectilinear guideways, and a roller carried by said connecting rod and constrained to follow said last mentioned guideway.

MAURICE BONNET.

REFERENCES CITED

The following references are of record in the file of this patent:

UNITED STATES PATENTS

| Number | Name | Date |
|---|---|---|
| 2,080,604 | Draper | May 18, 1937 |
| 2,160,277 | Neidich | May 30, 1939 |
| 2,175,114 | Friedman | Oct. 3, 1939 |